US010549481B1

(12) United States Patent
Klinstein et al.

(10) Patent No.: US 10,549,481 B1
(45) Date of Patent: Feb. 4, 2020

(54) SYSTEMS AND METHODS FOR LOW INITIAL WELD SPEED IN ULTRASONIC WELDING

(71) Applicant: Dukane IAS, LLC, St. Charles, IL (US)

(72) Inventors: Leo Klinstein, Glenview, IL (US); Paul J. Golko, Crystal Lake, IL (US)

(73) Assignee: Dukane IAS, LLC, St. Charles, IL (US)

( * ) Notice: Subject to any disclaimer, the term of this patent is extended or adjusted under 35 U.S.C. 154(b) by 0 days.

(21) Appl. No.: 16/352,082

(22) Filed: Mar. 13, 2019

Related U.S. Application Data

(60) Provisional application No. 62/783,459, filed on Dec. 21, 2018.

(51) Int. Cl.
*B32B 41/00* (2006.01)
*B29C 65/08* (2006.01)
*B29C 65/00* (2006.01)

(52) U.S. Cl.
CPC .............. *B29C 65/08* (2013.01); *B29C 66/11* (2013.01); *B29C 66/73921* (2013.01); *B29C 66/934* (2013.01)

(58) Field of Classification Search
CPC ..... B29C 65/08; B29C 66/8224; B29C 66/41; B29C 66/9516; B29C 66/45;

(Continued)

(56) References Cited

U.S. PATENT DOCUMENTS

| 4,179,059 A | 12/1979 | Chang et al. |
| 4,340,166 A | 7/1982 | Bilane et al. |

(Continued)

FOREIGN PATENT DOCUMENTS

| DE | 4120245 | 1/1992 |
| DE | 4026711 | 2/1992 |

(Continued)

OTHER PUBLICATIONS

Veröffentlichung des Zentralverbandes der Elektrotechnik- und Elektronikindustrie e.V. (ZVEI): Fügen von Formteilen und Halbzeugen aus thermoplastischen Kunststoffen mit Ultraschall, 1985, Fachverband Elektroschweißen, Frankfurt, DEXP00205090212405 (56 pages).

(Continued)

*Primary Examiner* — Michael N Orlando
*Assistant Examiner* — Joshel Rivera
(74) *Attorney, Agent, or Firm* — Nixon Peabody LLP

(57) ABSTRACT

An improved ultrasonic system and method. The ultrasonic stack is moved at a low, constant (or slowly varying) speed at the initiation of the welding operation, with this speed being maintained until the predetermined condition is satisfied. In some applications, this produces a higher quality weld, such as in applications involving plastic material that softens very quickly once ultrasonic energy is imparted to the workpieces being welded, which causes the force between the workpieces to decrease rapidly. Advancing the ultrasonic stack at a low speed or slow acceleration can avoid scuffing or marking of the surface of the workpiece in contact with the ultrasonic horn, decrease audible noise produced during the welding process, and improve the consistency of weld quality in such applications compared to conventional techniques.

16 Claims, 5 Drawing Sheets

(58) Field of Classification Search
CPC .......... B29C 66/8246; B29C 66/73921; B29C
66/9513; B29C 66/93431; B29C
66/93441; B29C 66/9231; B29C 66/8122;
B29C 66/847; B29C 66/961; B29C
66/822; B29C 66/932; B29C 66/934;
B29C 66/92921; B29C 66/92611; B23K
20/10
USPC .................... 156/60, 64, 350, 351, 378, 379
See application file for complete search history.

(56) References Cited

U.S. PATENT DOCUMENTS

| | | | |
|---|---|---|---|
| 4,496,095 | A | 1/1985 | Renshaw et al. |
| 5,110,381 | A | 5/1992 | Heckard et al. |
| 5,207,854 | A | 5/1993 | Becking |
| 5,295,700 | A | 3/1994 | Crews et al. |
| 5,397,408 | A | 3/1995 | Guzik |
| 5,491,372 | A | 2/1996 | Erhart |
| 5,557,154 | A | 9/1996 | Erhart |
| 5,706,627 | A | 1/1998 | Kirka et al. |
| 5,707,414 | A | 1/1998 | Leidy |
| 5,788,791 | A | 8/1998 | Grewell |
| 5,798,599 | A | 8/1998 | Harwood |
| 5,829,115 | A | 11/1998 | Speller, Jr. et al. |
| 5,880,580 | A | 3/1999 | Johansen |
| 5,985,064 | A | 11/1999 | Sato |
| 6,036,796 | A | 3/2000 | Halbert et al. |
| 6,118,095 | A | 9/2000 | Nagano |
| 6,190,296 | B1 | 2/2001 | Gnad et al. |
| 6,289,736 | B1 | 9/2001 | Statnikov |
| 6,450,393 | B1 | 9/2002 | Doumanidis et al. |
| 6,491,785 | B1 | 12/2002 | Sato et al. |
| 6,787,729 | B2 | 9/2004 | Dugas et al. |
| 6,828,522 | B2 | 12/2004 | Hochhalter et al. |
| 6,891,183 | B2 | 5/2005 | Kitamura et al. |
| 6,951,052 | B2 | 10/2005 | Clew |
| 6,965,091 | B2 | 11/2005 | Terada et al. |
| 6,984,921 | B1 | 1/2006 | Kosterman |
| 7,002,095 | B2 | 2/2006 | Kato et al. |
| 7,141,752 | B2 | 11/2006 | Hochhalter et al. |
| 7,819,158 | B2 | 10/2010 | Klinstein et al. |
| 8,052,816 | B2 | 11/2011 | Klinstein |
| 8,720,516 | B2 | 5/2014 | Klinstein |
| 9,144,937 | B2 | 9/2015 | Klinstein |
| 9,486,955 | B2 | 11/2016 | Klinstein |
| 9,849,628 | B2 | 12/2017 | Klinstein |
| 2002/0038792 | A1 | 4/2002 | Terada et al. |
| 2004/0069750 | A1 | 4/2004 | Kato et al. |
| 2004/0241267 | A1 | 12/2004 | Schultz |
| 2005/0077855 | A1 | 4/2005 | Hochhalter et al. |
| 2005/0194491 | A1 | 9/2005 | Hatano |
| 2005/0241143 | A1 | 11/2005 | Mizuno et al. |
| 2005/0284559 | A1 | 12/2005 | Ripplinger et al. |
| 2007/0068991 | A1 | 3/2007 | Handel et al. |
| 2007/0257087 | A1 | 11/2007 | Klinstein et al. |
| 2014/0367018 | A1* | 12/2014 | Klinstein ............ B29C 66/8224 156/64 |

FOREIGN PATENT DOCUMENTS

| | | |
|---|---|---|
| DE | 4317621 | 6/1994 |
| DE | 4321874 | 1/1995 |
| DE | 19753740 C1 | 7/1999 |
| DE | 69528314 T2 | 9/2002 |
| DE | 10354526 | 6/2005 |
| DE | 102006054760 | 5/2008 |
| EP | 0421019 | 4/1991 |
| EP | 0421018 | 3/1994 |
| JP | H03-183527 | 1/1993 |
| JP | H10128552 | 5/1998 |
| JP | 2006-231698 | 9/2006 |

OTHER PUBLICATIONS

Titel: Zeitgeäße Kunststoff-Verbindungstechnik . . . : für Thermoplaste; konstruktive u. techn. Arbeitshilfen; substituierende u. alternaive Fügetechnik, Verlag: Limeshain: Groeble, infotip, Erscheinungsjahr 1986, 304 Seiten, ISBN 3-88736-005-2 (64 pages).
Michaeli W et al.: "Bessere Nahtqualitaet Beim Ultraschallschweissen. \Better Weld Quality in Ultrasonic Welding", Kunststoffe, Carl Hanser Verlag, Munchen, DE, vol. 83, No. 9, Sep. 1, 1993 (pp. 667-670).
Fachbuchreihe Schweißtechnik Band 151, Title: Ultraschallfügen und-trennen, Prof. Dr.-Ing. habil. Johannes Wodara, Magdeburg, ISBN 3-87155-212-7, DVS-Verlag GmbH, Düsseldorf, 2004 (9 pages).
"Ultrasonic Metal Bonding System Bonding Process." ULTEX: Ultrasonic Laboratory. Sep. 7, 2005 (1 page).
European Search Report dated Aug. 5, 2010 which issued in European Application No. EP 09005008.9 (11 pages).
International Search Report dated May 2, 2008, which issued in related International Patent Application No. PCT/US2007/011011 (3 pages).
Written Opinion of International Searching Authority dated Nov. 8, 2008, which issued in related International Patent Application No. PCT/US2007/011011 (4 pages).

* cited by examiner

SYSTEMS AND METHODS FOR LOW INITIAL WELD SPEED IN ULTRASONIC WELDING

CROSS-REFERENCE TO RELATED APPLICATIONS

This application claims the benefit of and priority to U.S. Provisional Patent Application No. 62/783,459, titled "Systems and Methods for Low Initial Weld Speed in Ultrasonic Welding," filed Dec. 21, 2018, which is incorporated by reference in its entirety.

BACKGROUND

An ultrasonic welding method is disclosed in U.S. Pat. Nos. 8,052,816 and 9,486,955, in which the movement of the ultrasonic welding stack is delayed, following the initiation of the weld, until a predetermined condition is satisfied. During this delay, the speed of movement of the ultrasonic welding stack is zero as the stack is maintained at a stationary position. Similar methods for delaying motion, after some weld motion has already occurred, are disclosed in U.S. Pat. Nos. 9,144,937 and 9,849,628. Likewise, the speed of the ultrasonic welding stack in these methods is zero during the delays.

While the methods referenced above are beneficial in achieving high quality ultrasonic welds in the majority of applications, they can have undesirable consequences in some applications. In particular, in cases where the plastic material softens very quickly once ultrasonic energy is imparted to the workpieces being welded, the force between the workpieces decreases rapidly. This decrease can continue even after the predetermined condition for moving the ultrasonic welding stack is satisfied since this movement does not occur instantaneously due to various electrical and mechanical limitations of the motion system used to drive the movement of the stack, such as the limited rate at which electrical current can be ramped up in a motor. If the contact force between the workpieces becomes too low, the ultrasonic vibrations are not transmitted properly from the stack to the weld joint, potentially resulting in scuffing or marking of the surface of the workpiece in contact with the ultrasonic horn, a notable increase in audible noise during the welding process, and a reduction in the consistency of weld quality.

DESCRIPTION

The concepts described below are alternatives and improvements to the methods of delaying weld motion disclosed in prior art to remedy the aforementioned undesirable consequences of the disclosed methods.

Figure 1:
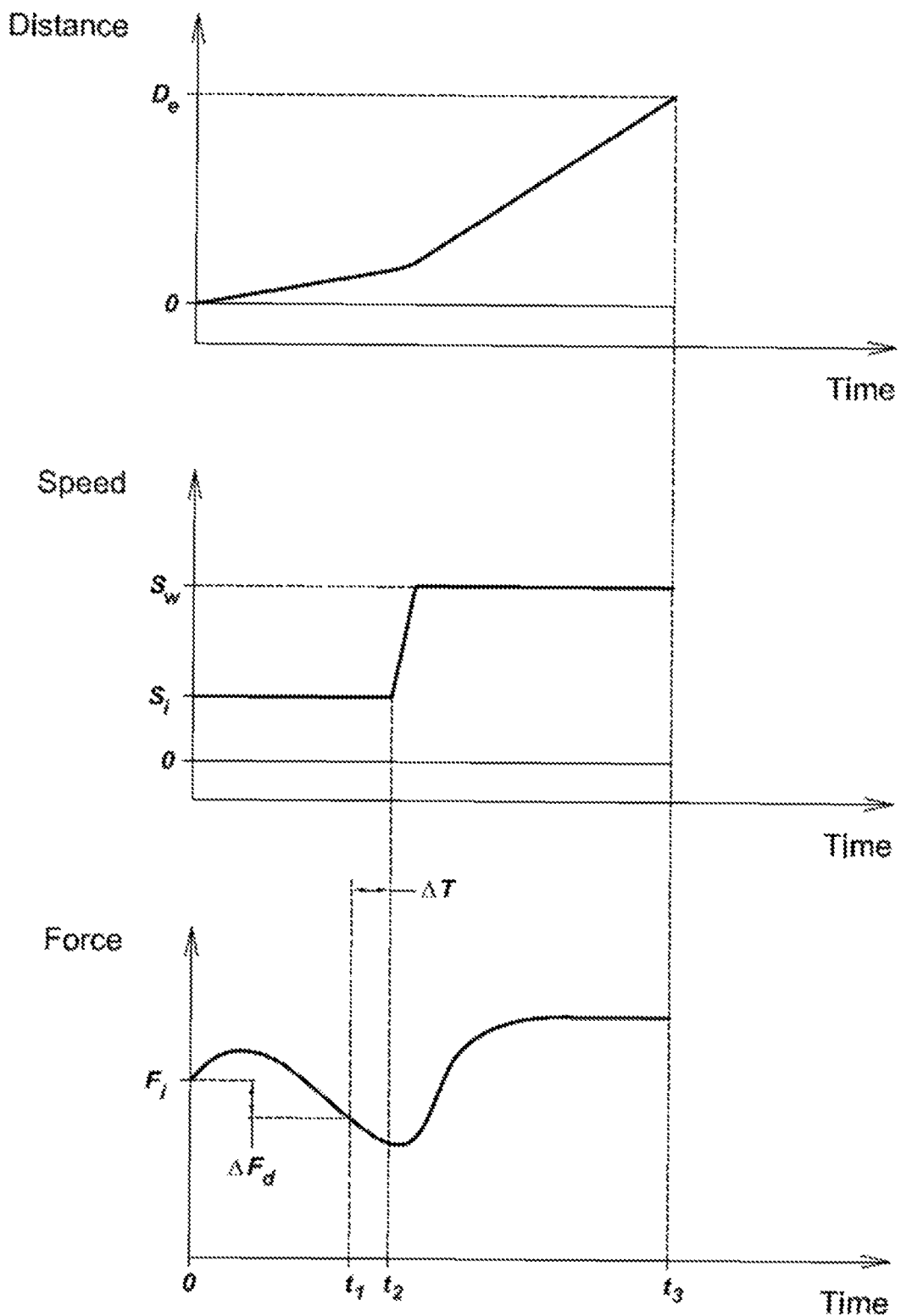
FIG. 1 shows graphs of the Distance traversed by an ultrasonic welding stack from the start of the weld, the Speed of movement of the stack, and the Force applied by the stack to workpieces versus time for a representative weld phase.

In one embodiment of the new concepts, the same ultrasonic welding method as described in U.S. Pat. No. 8,052,816 claim 1 is used, except that instead of moving the ultrasonic welding stack only after the signal corresponding to the monitored control variable satisfies a predetermined condition, the ultrasonic stack is moved at a low, constant speed at the initiation of the welding operation, with this speed being maintained until the predetermined condition is satisfied. An example of this method is illustrated in FIG. 1, which shows graphs of the Distance traversed by the ultrasonic welding stack from the start of the weld, the Speed of movement of the ultrasonic welding stack, and the Force applied by the ultrasonic welding stack to the workpieces versus time for a representative weld phase, which begins at Time 0 and ends at Time t3. The predetermined positive initial force is designated as Fi. At the initiation of the welding operation, the speed of the stack is a low, constant level Si. This speed is maintained until the predetermined condition is satisfied, which in this example is when the force decreases by the amount ΔFd relative to the initial force Fi, occurring at t1. Upon satisfaction of the condition, the motion control system commands the ultrasonic welding stack to move according to a weld profile, which in this example is an increase in speed to Sw, followed by maintaining a constant speed Sw. The actual change in speed from Si, however, does not occur instantly due to the aforementioned electrical and mechanical limitations of the motion system. Instead, the actual change in speed begins some time after the predetermined condition is satisfied, which is represented at t2. This motion system response delay is designated in the figure as ΔT. In this example, the weld ends when the distance traversed by the ultrasonic welding stack from the start of the weld reaches the predetermined level De. It should be noted, however, that this method of using a low initial weld speed is not limited to the particular weld profile and method for ending the weld cited in this example. Practical values of the initial speed Si are generally less than half of the average speed of the weld motion subsequent to the satisfaction of the predetermined condition.

Figure 2:
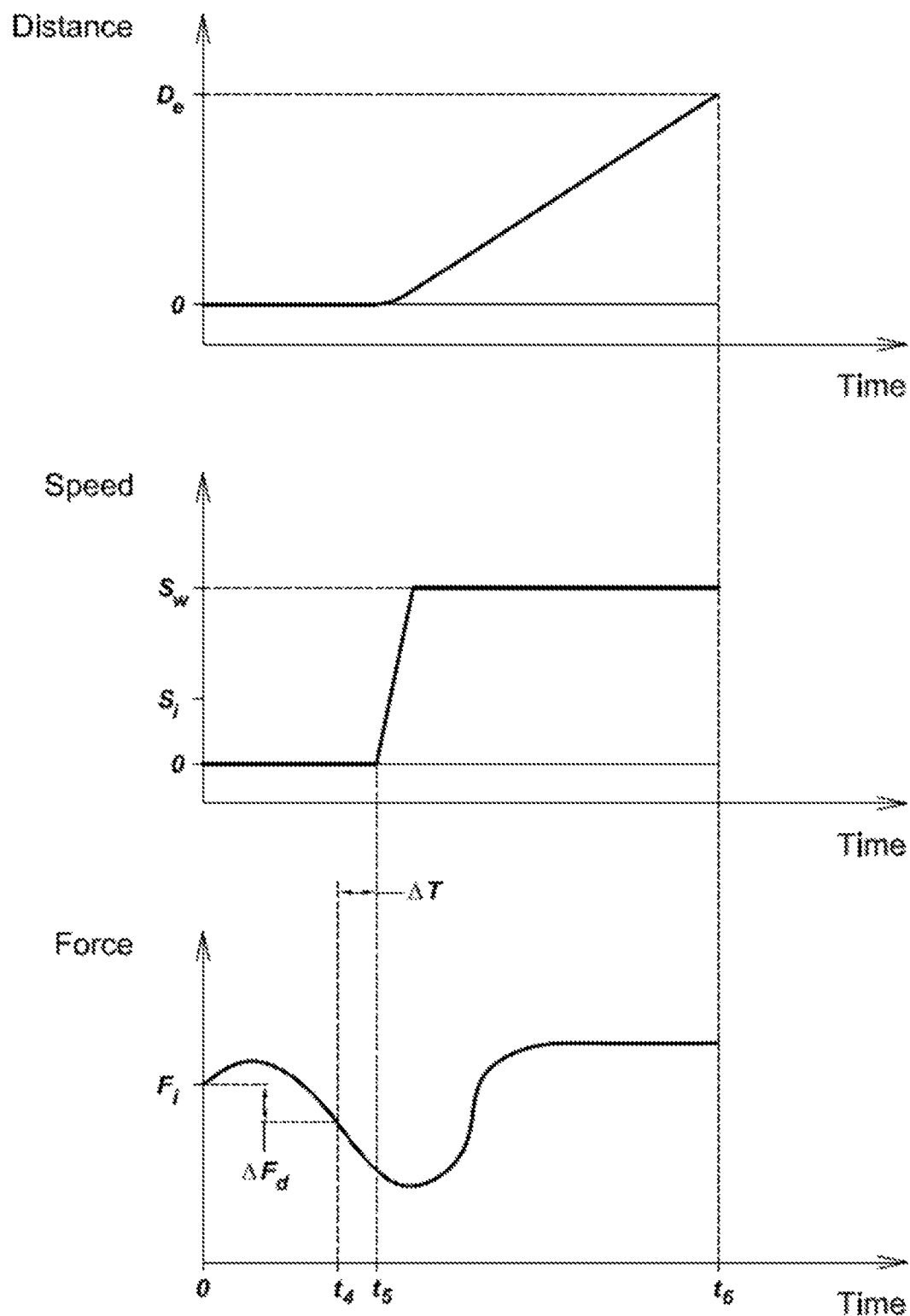
FIG. 2 shows graphs of Distance, Speed, and Force versus Time for welding of the same workpieces described in connection with FIG. 1, except using the prior art method of delayed motion.
Figure 3:
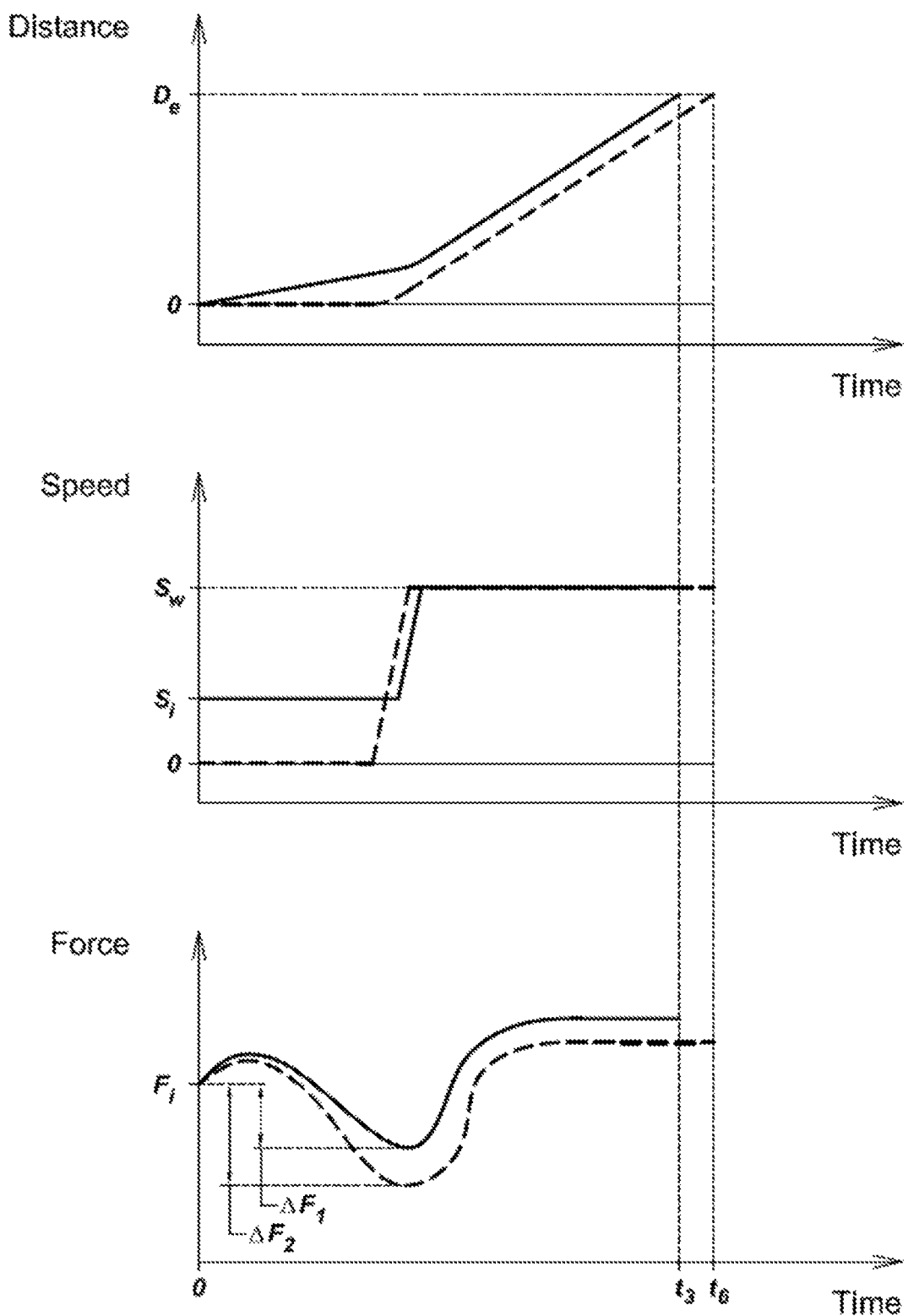
FIG. 3 shows the graphs of FIG. 1 and FIG. 2 superimposed on one another for the purposes of direct comparison.

The benefits of using this technique are illustrated in FIGS. 2 and 3. FIG. 2 shows graphs of Distance, Speed, and Force versus Time for welding of the same workpieces described in connection with FIG. 1, except using the prior art method of delayed motion. The speed of the ultrasonic stack is zero until the same predetermined condition is satisfied, consisting of the decrease in the force relative to the initial force by ΔFd, occurring at t4. Upon satisfaction of the condition, the motion control system commands the ultrasonic welding stack to move according to the same weld profile, consisting of a change in speed to Sw, followed by maintaining a constant speed Sw. In addition, the same motion system response delay ΔT exists, whereby the actual start of motion occurs at t5, which is ΔT after the predetermined condition is satisfied. As in FIG. 1, the weld ends when the distance traversed by the ultrasonic welding stack reaches De.

FIG. 3 shows the graphs of FIG. 1 and FIG. 2 superimposed on one another for the purposes of direct comparison. The solid curves are the same as those shown in FIG. 1 representing the low initial weld speed method, and the long dashed lines are the same as FIG. 2 representing the prior art motion delay method. The primary benefit of the low initial speed method is that the decrease in force between the workpieces relative to the initial force Fi is smaller compared to the motion delay method. In the Force versus Time graph of FIG. 3, the force decrease for the low initial weld speed method is ΔF1, which is smaller than the decrease for the motion delay method ΔF2. The reason for this difference is that during the motion system response delay (ΔT), which is common to both methods, the workpieces continue to be collapsed against each other in the low initial weld speed method, which mitigates the decrease in force compared to the motion delay method, where there is no workpiece collapse during the delay. Thus the occurrence of the undesirable effects stemming from the contact force between the horn and workpieces becoming too low is less likely using the low initial weld speed method. Another benefit of this method is that it can lead to a decrease in the duration of the weld, and therefore an increase in production throughput. In the examples depicted in FIG. 3, the weld was shorter for the low initial weld speed method by the amount t6–t3.

Figure 4A:
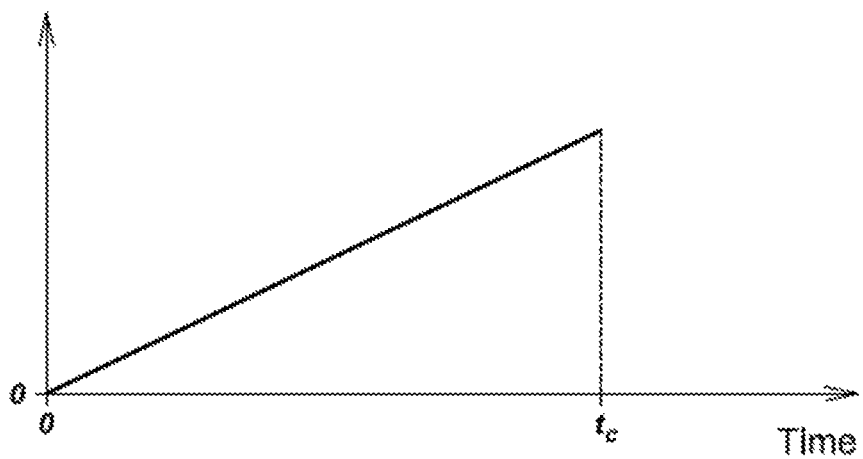
FIG. 4A shows a linearly increasing speed profile, where the initial speed is zero.
Figure 4B:
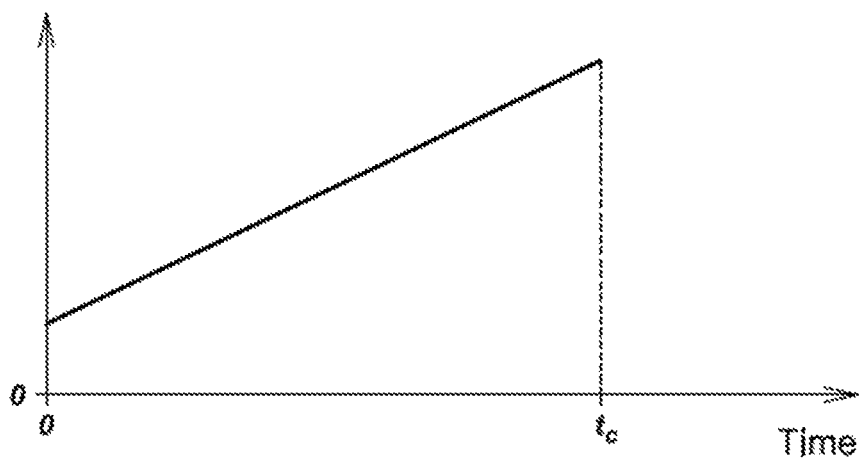
FIG. 4B shows a linearly increasing speed profile, where the initial speed is non-zero.
Figure 4C:
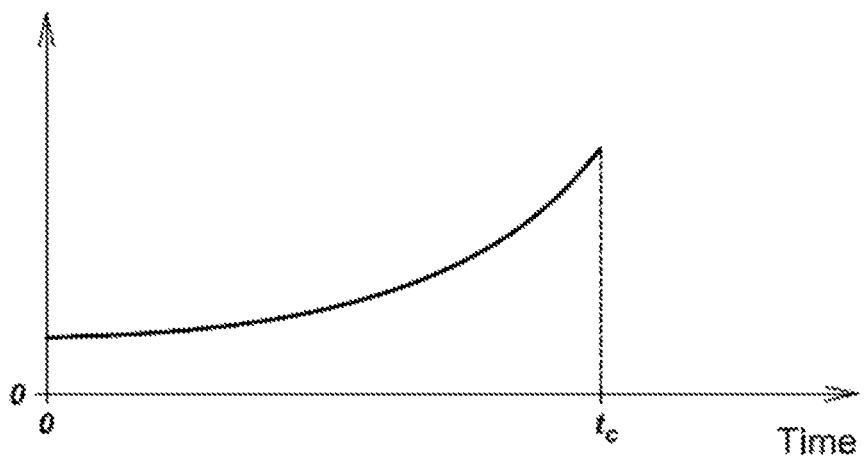
FIG. 4C shows the speed as a second order polynomial function of time.
Figure 5:
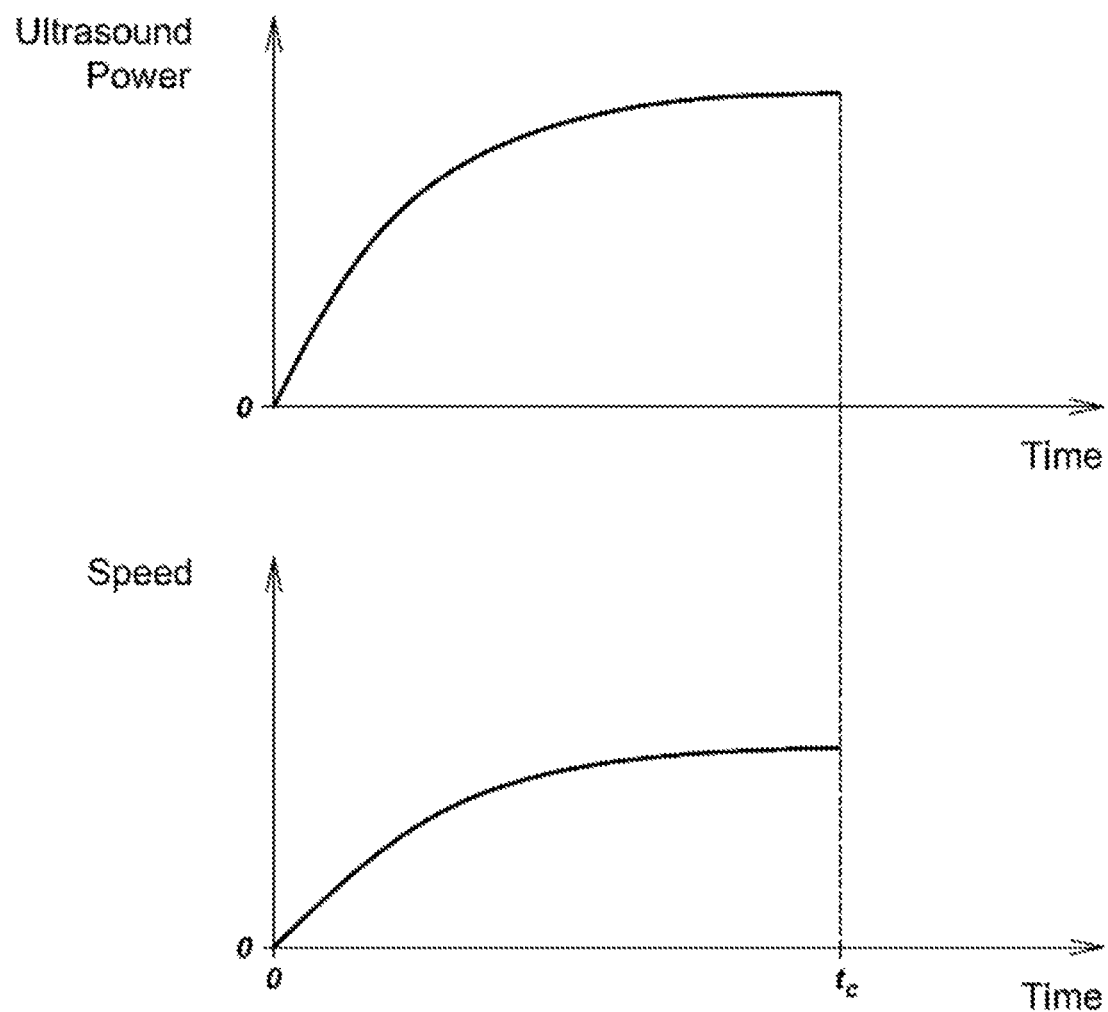
FIG. 5 shows graphs of Ultrasound Power and Speed versus Time, where the speed is directly proportional to the ultrasound power.

The low initial weld speed is not restricted to being constant as depicted in the example above. It can be a variety of different linear or non-linear functions of time or other parameters associated with the weld process, such as the power being output from the ultrasonic welding stack to the workpieces. Several examples are illustrated in FIG. 4, which show graphs of Speed versus Time from the initiation of the weld process at Time 0 until the predetermined condition is satisfied at tc. FIG. 4A shows a linearly increasing speed profile, where the initial speed is zero. FIG. 4B shows a linearly increasing speed profile, where the initial speed is non-zero. FIG. 4C shows the speed as a second order polynomial function of time. FIG. 5 shows graphs of Ultrasound Power and Speed versus Time, where the speed is directly proportional to the ultrasound power. Regardless of the function, the average speed of motion, from the initiation of the weld until the predetermined condition is satisfied, is generally less than half of the average speed of the weld motion from the predetermined condition being satisfied to the end of the weld.

What is claimed is:

1. An ultrasonic welding method comprising:
   pressing an ultrasonic welding stack against a first workpiece;
   initiating a weld by outputting energy from the ultrasonic welding stack to the first workpiece;
   monitoring, with at least one sensor, at least one control variable beginning at the initiating of the weld;
   moving the ultrasonic welding stack at a first low constant speed, beginning at the initiating of the weld, until the at least one signal corresponding to the at least one control variable satisfies a predetermined condition;
   moving the ultrasonic welding stack at a second speed responsive to the at least one control variable satisfying the predetermined condition, wherein the second speed is greater than the first low constant speed.

2. The method of claim 1, wherein the first low constant speed is less than half of the second.

3. The method of claim 1, wherein the predetermined condition is a specified absolute or relative value of force, wherein reference for the relative value is the level of force at the initiation of the weld.

4. The method of claim 1, wherein the predetermined condition is a specified ultrasound power or a specified ultrasound energy.

5. The method of claim 1, wherein the predetermined condition is a specified distance traversed by the ultrasonic welding stack from the initiation of the weld or a specified position of the ultrasonic welding stack.

6. The method of claim 1, wherein the predetermined condition is a specified elapsed time from the initiation of the weld.

7. The method of claim 1, wherein the predetermined condition includes one or more of a specified absolute or relative value of
   a) force,
   b) output torque of a motor or actuator driving the movement of the ultrasonic welding stack,
   c) position of the ultrasonic welding stack,
   d) distance traversed by the ultrasonic welding stack,
   e) ultrasound power,
   f) ultrasound energy,
   g) ultrasound amplitude,
   h) ultrasound frequency,
   i) ultrasound phase, and
   j) elapsed time,
   wherein reference for the relative value is a level of a respective parameter sensed at the initiation of the weld.

8. The method of claim 1, wherein the second speed is constant.

9. The method of claim 1, wherein the pressing includes applying a positive initial force to the workpiece.

10. The method of claim 9, wherein the monitored control variable is a measured force applied by the weld stack on the workpiece, and the predetermined condition is a based on a difference between the initial force and the measured force.

11. An ultrasonic welding method comprising:
    pressing an ultrasonic welding stack against a workpiece;
    initiating a weld by outputting energy from the ultrasonic welding stack to the workpiece at an initial time $t_0$;
    monitoring a control variable beginning at the initial time $t_0$;
    moving the ultrasonic welding stack relative to the workpiece at a first constant speed beginning at the initial time $t_0$;
    determining that the monitored control variable satisfies a predetermined condition at a first time $t_1$ that is subsequent to the initial time $t_0$; and
    moving the ultrasonic welding stack relative to the workpiece at a second constant speed subsequent to a second time $t_2$ that is subsequent to the initial time $t_1$, wherein the second constant speed is greater than the first constant speed.

12. The method of claim 11, further comprising moving the ultrasonic welding stack at a variable speed beginning at the second time $t_2$ until the ultrasonic welding stack reaches the second constant speed.

13. The method of claim 11, further comprising moving the ultrasonic welding stack relative to the workpiece at the second constant speed until the ultrasonic welding stack has moved a predetermined distance relative to an initial position of the ultrasonic welding stack at the initial time $t_0$.

14. The method of claim 11, further comprising moving the ultrasonic welding stack relative to the workpiece at the second constant speed until a third time $t_3$.

15. The method of claim 11, wherein the predetermined condition includes a force, an output torque of a motor or actuator driving the moving of the ultrasonic welding stack, a position of the ultrasonic welding stack, an ultrasound power, an ultrasound energy, an ultrasound amplitude, an ultrasound frequency, an ultrasound phase, an elapsed time, or any combination thereof.

16. The method of claim 11, wherein the first constant speed is less than half of the second constant speed.

* * * * *